(12) United States Patent
Smith

(10) Patent No.: US 10,751,817 B1
(45) Date of Patent: Aug. 25, 2020

(54) SAWBLADE GRINDING METHODS, SAWBLADE GRINDING PREPARATION METHODS AND SAWBLADES

(71) Applicant: Paul Smith, Garrison, TX (US)

(72) Inventor: Paul Smith, Garrison, TX (US)

( * ) Notice: Subject to any disclaimer, the term of this patent is extended or adjusted under 35 U.S.C. 154(b) by 136 days.

(21) Appl. No.: 15/243,169

(22) Filed: Aug. 22, 2016

(51) Int. Cl.
*B23D 61/02* (2006.01)
*B23D 63/12* (2006.01)

(52) U.S. Cl.
CPC ........... *B23D 61/025* (2013.01); *B23D 63/12* (2013.01); *B23D 61/021* (2013.01)

(58) Field of Classification Search
CPC ...... B23D 63/10; B23D 63/105; B23D 63/12; B23D 63/123; B23D 63/126; B23D 63/14; B23D 63/201; B23D 63/206; B23D 61/02; B23D 61/021; B23D 61/025; Y10T 83/9319; Y10T 83/9367; Y10T 83/9365
USPC .......................................... 83/835, 854, 855
See application file for complete search history.

(56) References Cited

U.S. PATENT DOCUMENTS

| | | | | |
|---|---|---|---|---|
| 542,548 A * | 7/1895 | Barker | ................... | B23D 63/14 76/50 |
| 3,362,446 A * | 1/1968 | Potomak | ................. | B23D 61/04 83/855 |
| 3,938,417 A * | 2/1976 | Nedsten | ................ | B23D 47/005 144/218 |
| 4,135,421 A * | 1/1979 | Bertram | ................ | B23D 61/021 83/835 |
| 5,485,767 A * | 1/1996 | Ellis | ........................ | B23D 63/14 76/37 |
| 5,488,884 A * | 2/1996 | Andrianoff | .......... | B23D 63/005 76/37 |
| 5,564,324 A * | 10/1996 | Bird | ........................ | B23D 61/12 83/661 |
| 2010/0126326 A1* | 5/2010 | Cloutier | ................. | B23D 61/04 83/835 |
| 2014/0260878 A1* | 9/2014 | Bird | ....................... | B23D 61/025 83/835 |
| 2015/0367433 A1* | 12/2015 | Knebel | ................ | B23D 61/025 83/835 |

FOREIGN PATENT DOCUMENTS

CA 2313842 A1 * 1/2002 ........... B23D 61/021

* cited by examiner

*Primary Examiner* — Evan H MacFarlane
(74) *Attorney, Agent, or Firm* — R. Keith Harrison

(57) ABSTRACT

Methods of grinding a sawblade include providing a sawblade plate; fabricating a plurality of sawblade teeth in the sawblade plate, each of the plurality of sawblade teeth having a pair of opposite tooth surfaces, a tooth back, a tooth gullet, a tooth face extending generally from the tooth back to the tooth gullet and a tooth edge on the tooth face; forming at least one blade relief in at least one of the opposite tooth surfaces of each of the plurality of sawblade teeth at the tooth face generally between the tooth edge and the tooth gullet; grinding the tooth edge of each of the plurality of sawblade teeth by rotation and movement of a grinding wheel along and against the tooth edge generally from the tooth back to the blade relief; and terminating the movement of the grinding wheel at the blade relief.

15 Claims, 6 Drawing Sheets

US 10,751,817 B1

SAWBLADE GRINDING METHODS, SAWBLADE GRINDING PREPARATION METHODS AND SAWBLADES

FIELD

Illustrative embodiments of the disclosure generally relate to sawblades for circular saws. More particularly, illustrative embodiments of the disclosure relate to sawblade grinding methods, sawblade grinding preparation methods and sawblades which are prepared for grinding according to the methods.

BACKGROUND

The background description provided herein is solely for the purpose of generally presenting the context of the illustrative embodiments of the disclosure. Aspects of the background description are neither expressly nor impliedly admitted as prior art against the claimed subject matter.

A sawmill or lumber mill is a facility in which logs are cut to form lumber. In a typical conventional sawmill, a circular saw includes a sawblade plate having multiple sawblade teeth on its edge. The sawblade is rotated against the end of a log to longitudinally cut the log into multiple lumber pieces. The sawblade teeth on the circular saw each typically includes a tooth edge which contacts the wood being cut. Before initial use of the circular saw, as well as after periods of use, the tooth edge may require sharpening. Thus, a grinding wheel may be rotated against the tooth edge as it is typically moved from the tip to the gullet or base of the tooth, where the grinding wheel may have a tendency to contact and potentially damage the sawblade plate.

Therefore, sawblade grinding methods, sawblade grinding preparation methods and sawblades which are prepared for grinding according to the methods are needed.

SUMMARY

Illustrative embodiments of the disclosure generally relate to methods of grinding a sawblade. An illustrative embodiment of the methods of grinding a sawblade include providing a sawblade plate; fabricating a plurality of sawblade teeth in the sawblade plate, each of the plurality of sawblade teeth having a pair of opposite tooth surfaces, a tooth back, a tooth gullet, a tooth face extending generally from the tooth back to the tooth gullet and a tooth edge on the tooth face; forming at least one blade relief in at least one of the opposite tooth surfaces of each of the plurality of sawblade teeth generally at the tooth face between the tooth edge and the tooth gullet; grinding the tooth edge of each of the plurality of sawblade teeth by rotation and movement of a grinding wheel along and against the tooth edge generally from the tooth back to the blade relief; and terminating the movement of the grinding wheel at the blade relief.

Illustrative embodiments of the disclosure further generally relate to saw blade grinding preparation method. An illustrative embodiment of the method includes providing a sawblade plate; fabricating a plurality of sawblade teeth in the sawblade plate, each of the plurality of sawblade teeth having a pair of opposite tooth surfaces, a tooth back, a tooth gullet, a tooth face extending generally from the tooth back to the tooth gullet and a tooth edge on the tooth face; and forming at least one blade relief in at least one of the opposite tooth surfaces of each of the plurality of sawblade teeth at the tooth face generally between the tooth edge and the tooth gullet.

Illustrative embodiments of the disclosure are further generally directed to sawblades prepared for grinding. An illustrative embodiment of the sawblades includes a sawblade plate having a sawblade plate outer edge; a plurality of sawblade teeth in the sawblade plate outer edge of the sawblade plate, the plurality of sawblade teeth each having a pair of opposite tooth surfaces, a tooth back, a tooth gullet, a tooth face extending generally from the tooth back to the tooth gullet and a tooth edge on the tooth face; and at least one blade relief in at least one of the opposite tooth surfaces of each of the plurality of sawblade teeth generally at the tooth face between the tooth edge and the tooth gullet.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
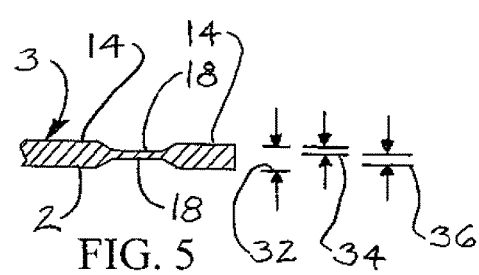
FIG. 5 is a cross-sectional view of a sawblade tooth, taken along section line 5-5 in FIG. 3.
Figure 6A:
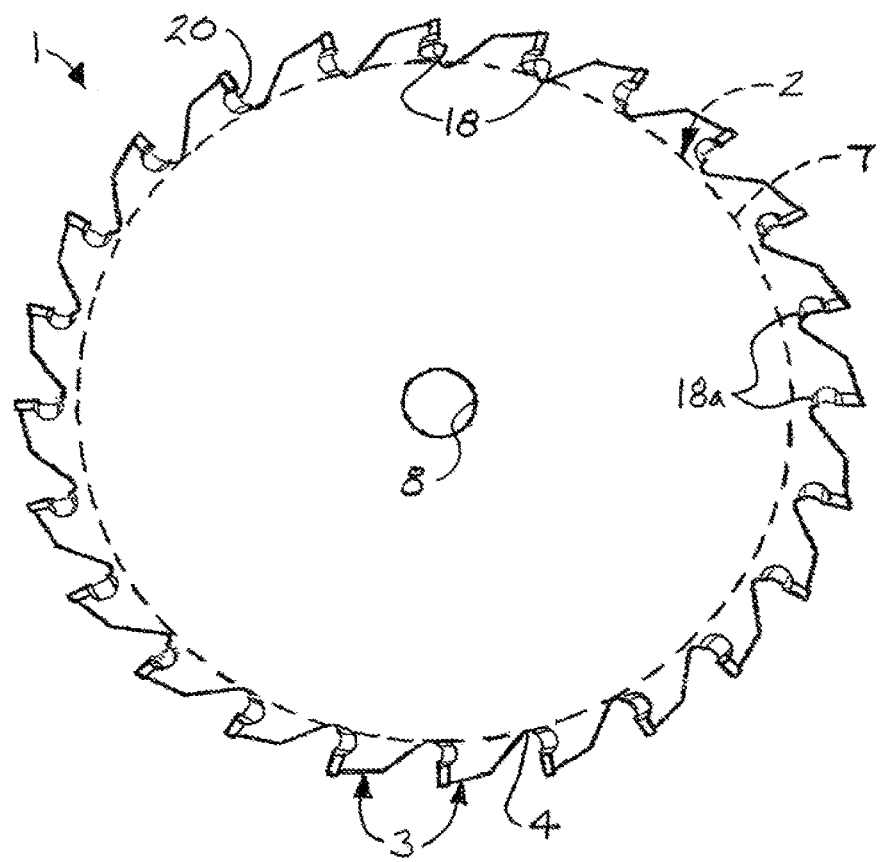
FIG. 6A is a side view of a circular saw blade according to an illustrative embodiment of the disclosure, more particularly illustrating the sawblade plate (illustrated in phantom) and multiple sawblade teeth extending from a sawblade plate outer edge of the sawblade plate.
Figure 6B:
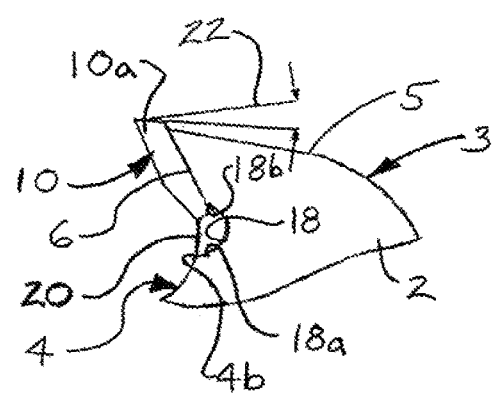
FIG. 6B is an enlarged side view of a sawblade tooth, more particularly illustrating a typical radial tooth angle of a tooth edge on the sawblade tooth which can be achieved according to the methods of the disclosure.
Figure 7:
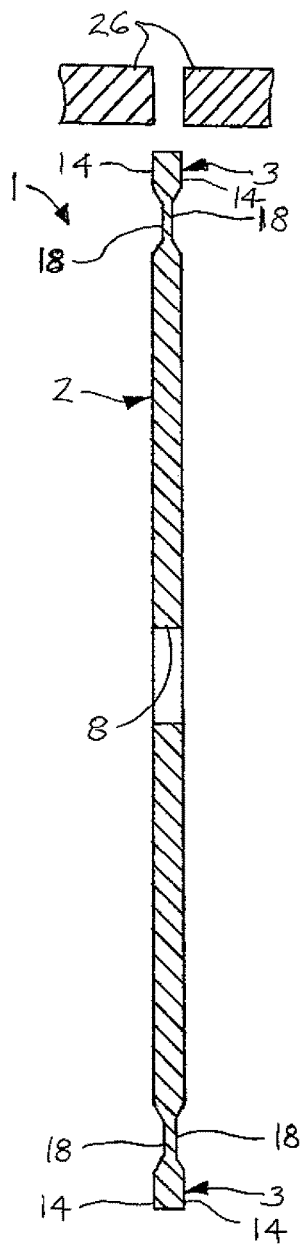
FIGS. 7-9 are sectional views of a sawblade and a pair of grinding wheels (illustrated in section), more particularly illustrating typical sequential grinding of the sawblade teeth on the sawblade according to the disclosure.
Figure 8:
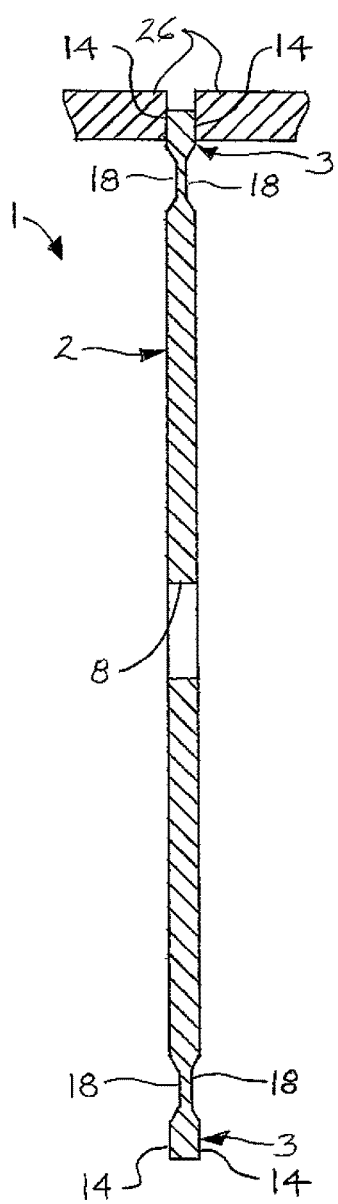
Figure 9:
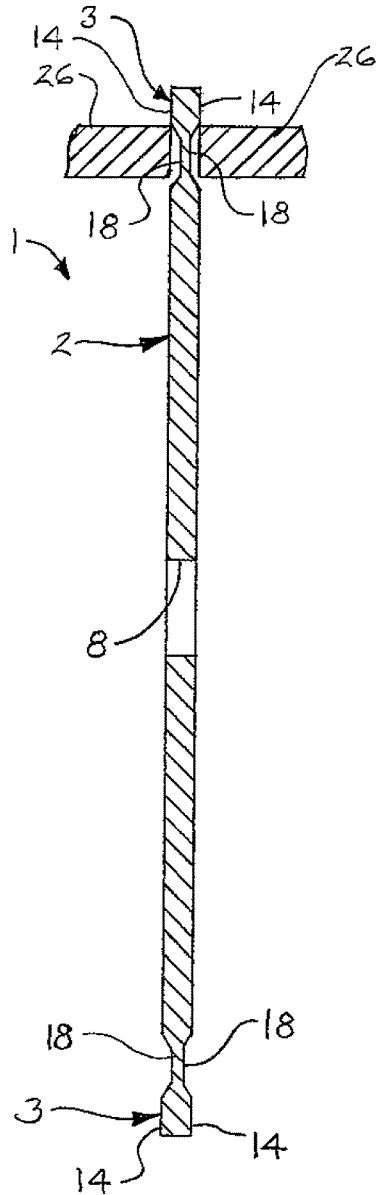

Referring initially to FIGS. 1-6B of the drawings, an illustrative embodiment of the sawblades prepared for grinding according to the sawblade grinding methods and sawblade grinding preparation methods of the disclosure is generally indicated by reference numeral 1. As illustrated in FIG. 6A, the sawblade 1 may include a sawblade plate 2 typically having a sawblade plate outer edge 7 and a central shaft opening 8. Sawblade teeth 3 may be fabricated in or on the sawblade plate outer edge 7 using any suitable saw tooth fabrication mechanism known by those skilled in the art. Non-exclusive techniques which may be used to fabricate the sawblade teeth 3 include brazing, welding, joining, inserting, attaching using other means, or any combination thereof. As illustrated in FIGS. 7-9 and will be hereinafter described, the sawblade grinding methods and sawblade grinding preparation methods of the disclosure may facilitate grinding or shaping of the sawblade teeth 3 using grinding wheels 26 while preventing the grinding wheels 26 from contacting and potentially damaging the sawblade plate 2 during the grinding process.

Figure 2:
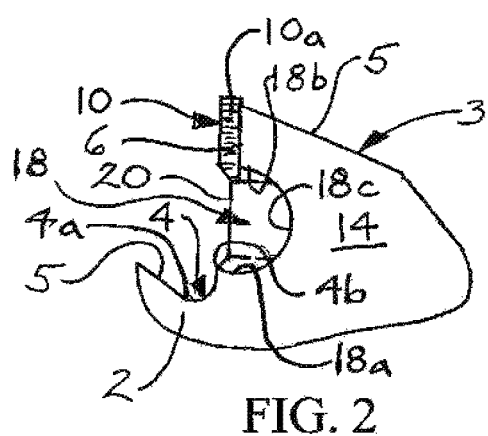
FIG. 2 is an enlarged sectional view, taken along section line 2 in FIG. 1.
Figure 4:
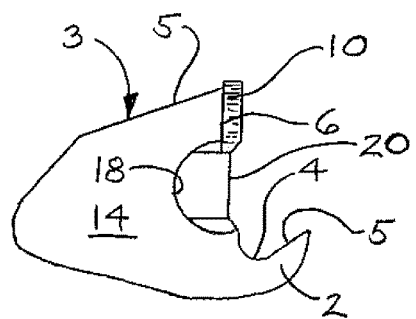
FIG. 4 is an enlarged sectional view, taken along section line 4 in FIG. 3.

As illustrated in FIGS. 2 and 4, in some embodiments, each sawblade tooth 3 on the sawblade plate 2 may have a pair of opposite tooth surfaces 14 which may correspond in position to the respective opposite surfaces of the sawblade plate 2, a typically convex tooth back 5, a curved or concave tooth gullet 4 at generally the sawblade plate outer edge 7 (FIG. 6A) of the sawblade plate 2 and a tooth face 6 extending from the front edge of the tooth back 5 to the tooth gullet 4. As illustrated in FIG. 2, each tooth gullet 4 may have a gullet bottom 4a and a gullet top 4b. A tooth edge 10 may extend along the tooth face 6. The tooth edge 10 may face the tooth back 5 of the adjacent sawblade tooth 3. Each tooth edge 10 may have a pair of tooth edge sides 10a.

Figure 1:
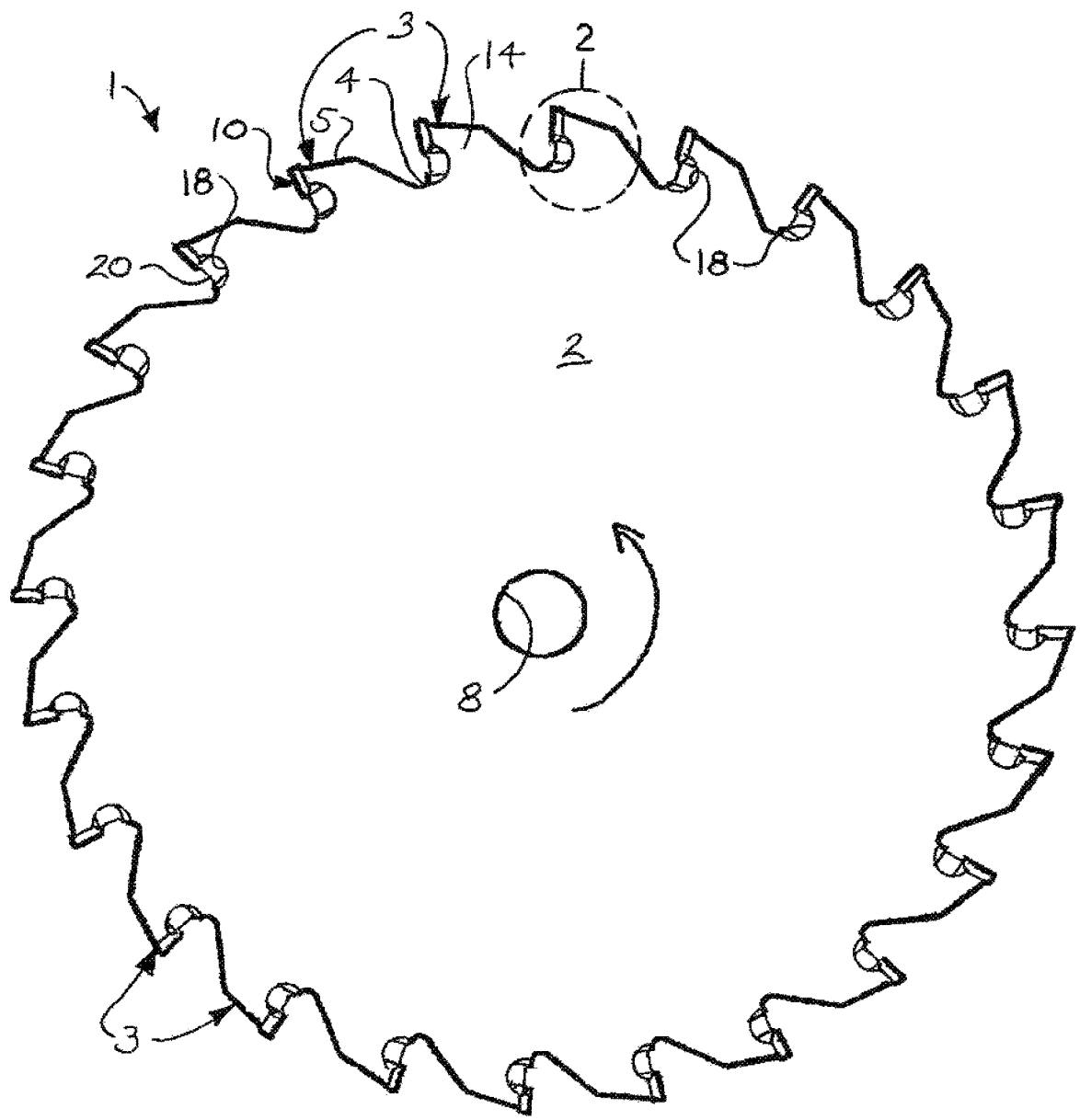
FIG. 1 is a side view of a circular sawblade according to an illustrative embodiment of the present disclosure.
Figure 3:
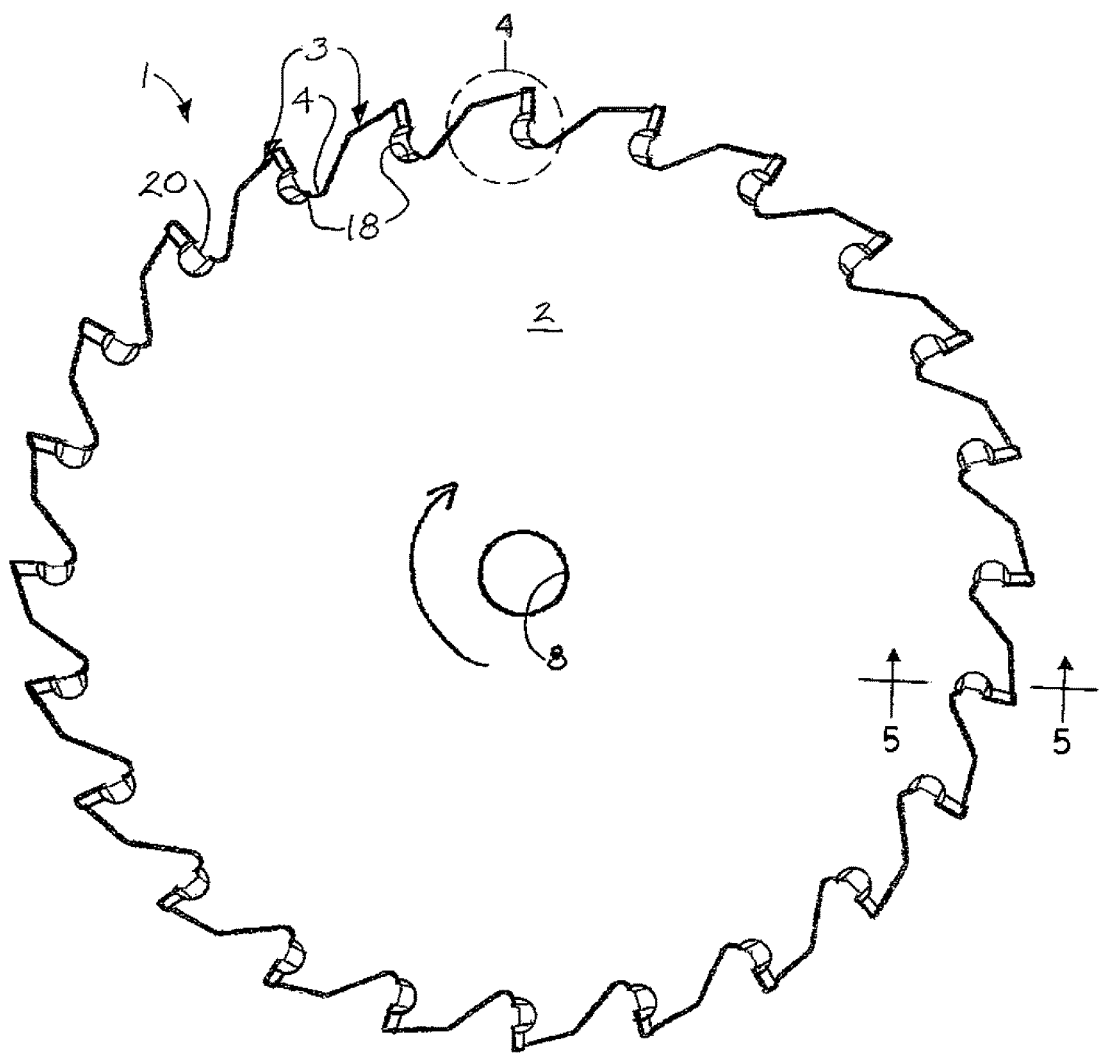
FIG. 3 is a side view of the circular sawblade opposite to that illustrated in FIG. 1.

As illustrated in FIG. 1, at least one blade relief 18 may be provided in at least one of the opposite tooth surfaces 14 of each sawblade tooth 3 at the tooth face 6 generally between the tooth edge 10 and the tooth gullet 4. The blade relief 18 may extend into the tooth face 6. As illustrated in FIGS. 1 and 3, in some embodiments, the blade relief 18 may be provided in both of the opposite tooth surfaces 14 of each sawblade tooth 3. Accordingly, the blade reliefs 18 may substantially form mirror-images of each other in the opposite tooth surfaces 14. The forward or cutting edge of each blade relief 18 may form a blade kerf 20 which extends from the tooth edge 10 to the tooth gullet 4. Each blade relief 18 may be machined, ground, cast and/or otherwise placed or fabricated into the corresponding tooth surface 14 of the sawblade tooth 3 according to the knowledge of those skilled in the art. Accordingly, as illustrated in FIG. 6B and will be hereinafter described, the blade reliefs 18 may facilitate the greatest top clearance angle or radial tooth angle 22 which is possible without having the grinding wheels 26 (FIGS. 7-9) contact the sawblade plate 2 during grinding or shaping of the sawblade teeth 3. Each blade relief 18 may have an inner radial relief edge 18a and an outer radial relief edge 18b radially outside the inner radial relief edge 18a. The inner radial relief edge 18a may terminate at the gullet top 4b, radially outside the gullet bottom 4a and generally radially outside the sawblade outer edge 7. As illustrated in FI. 2, a curved relief boundary 18c may extend from the inner radial relief edge 18a to the outer radial relief edge 18b of each blade relief 18. As illustrated in FIG. 6A, each blade relief 18 may be disposed entirely radially outside the sawblade plate outer edge 7 of the sawblade plate 2.

As illustrated in FIG. 5, in some embodiments, each blade relief 18 may have a generally scalloped concave cross-section. In other embodiments, each blade relief 18 may have a generally semicircular or other cross-section. As further illustrated in FIG. 5, the quantity of blade material which is removed from the sawblade plate 2 to form the blade reliefs 18 (the blade relief depth 34) of each blade relief 18 may be determined by the radial tooth angle 22 (FIG. 6B) which is needed on the sawblade teeth 3 for satisfaction of the particular application. For example and without limitation, in some non-limiting embodiments, for a sawblade tooth 3 having a tooth thickness 32 of about 0.090 inch, the blade relief depth 34 of each blade relief 18 may be about 0.005 inch, leaving a blade relief thickness 36 of about 0.080 inch. This renders it possible to leave as much as 0.010 and/or more on the radial tooth angle 22 (FIG. 6B) (top to bottom) without the necessity of the grinding wheels 26 (FIGS. 7-9) contacting the sawblade plate 2. In accordance with the methods of the disclosure, the tooth edge or edges 10 of the sawblade teeth 3 can be ground in such a way that the blade kerf 20 can be as low as the sawblade plate outer edge 7 of the sawblade plate 2 without contact of the grinding wheels 26 with and damage to the sawblade plate 2 during grinding. As illustrated in FIG. 6A, each blade relief 18 may have an inner radial relief edge 18a which terminates generally radially outside sawblade plate outer edge 7. As illustrated in FIG. 2, the inner radial relief edge 18a of each blade relief 18 may terminate generally at the gullet top 4b and radially outside the gullet bottom 4a of each tooth gullet 4.

Referring next to FIGS. 7-9 of the drawings, in typical application, one or a pair of grinding wheels 26, which may be conventional, is operated to sharpen or grind the tooth edge 10 of each sawblade tooth 3 on the sawblade 1. Periodic sharpening or grinding of the tooth edge 10 of the respective sawblade teeth 3 may be necessary for optimum performance of the sawblade 1, as is known by those skilled in the art. Accordingly, as illustrated in FIG. 7, the grinding wheel 26 may initially be placed above and adjacent to a tooth surface 14 on the blade tooth 3 which is to be ground. Beginning at the outer edge of the tooth edge 10, as it is rotated, the grinding wheel 26 is next moved radially inwardly along and against the tooth edge 10 (FIGS. 2 and 4), as illustrated in FIG. 8, generally to the blade relief 18. After it reaches the blade relief 18, as illustrated in FIG. 9, rotation and movement of the grinding wheel 26 may be terminated. The radial position of the sawblade 1 may then be readjusted for like grinding of the remaining successive sawblade teeth 3.

Figure 10:
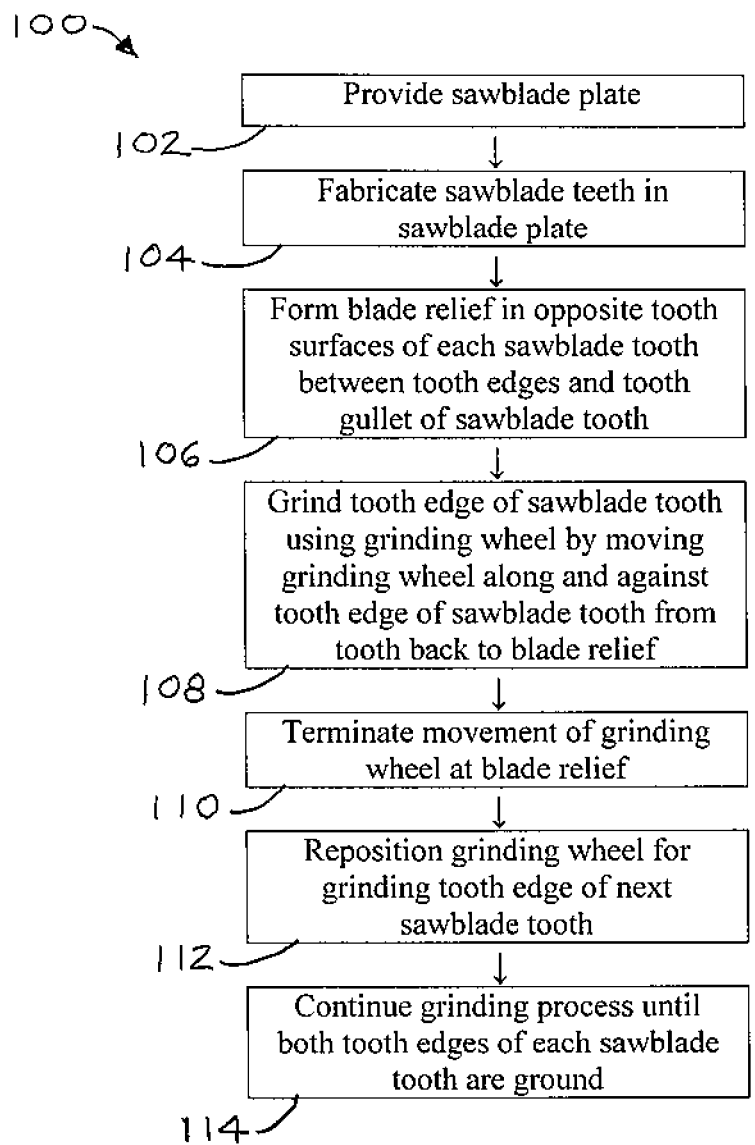
FIG. 10 is a flow diagram of a typical sawblade grinding method.

Referring next to FIG. 10 of the drawings, a flow diagram 100 of an illustrative embodiment of the sawblade grinding methods is illustrated. At Step 102, a sawblade plate may be provided. At Step 104, sawblade teeth may be fabricated in the sawblade plate. At Step 106, a blade relief may be formed in at least one tooth surface of each sawblade tooth between the tooth edge and the tooth gullet. At Step 108, the tooth edge of the sawblade tooth may be ground using at least one grinding wheel by rotating and moving the grinding wheel radially inwardly along and against the tooth edge of the sawblade tooth generally from the tooth back or outer edge of the sawblade tooth to the blade relief of the sawblade. At Step 110, movement of the grinding wheel may be terminated at the blade relief. At Step 112, the grinding wheel may be radially repositioned for like grinding the tooth edge of the next sawblade tooth on the sawblade. At Step 114, the grinding process may be continued until the tooth edge of each sawblade tooth is ground.

Figure 11:
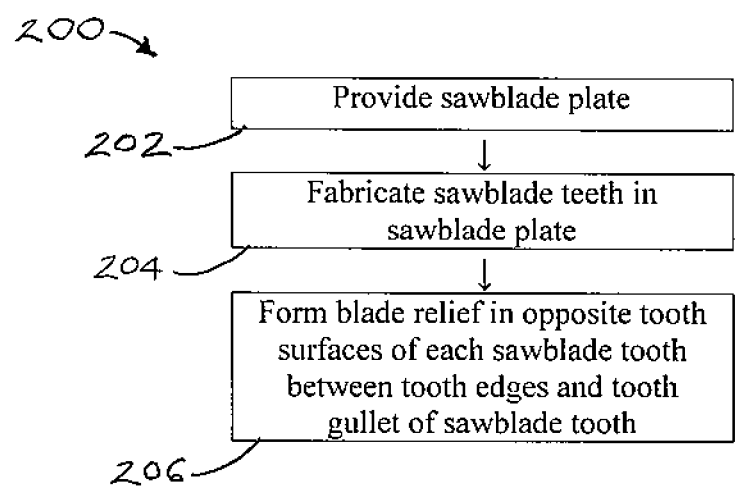
FIG. 11 is a flow diagram of a typical sawblade grinding preparation method.

Referring next to FIG. 11 of the drawings, a flow diagram 200 of an illustrative embodiment of the sawblade grinding preparation methods is illustrated. At Step 202, a sawblade plate may be provided. At Step 204, sawblade teeth may be fabricated in the sawblade plate. At Step 206, at least one blade relief may be formed in at least one of a pair of opposite tooth surfaces of each sawblade tooth between the tooth edge and the tooth gullet.

What is claimed is:

1. A method of grinding a sawblade, comprising:
   providing a sawblade plate having a central shaft opening;
   fabricating a plurality of sawblade teeth on the sawblade plate and leaving a sawblade plate outer edge radially outside the central shaft opening and inside the plurality of sawblade teeth, each of the plurality of sawblade teeth extending from the sawblade plate outer edge and having a pair of opposite tooth surfaces, a tooth back, a tooth gullet with a gullet top and a gullet bottom, the gullet bottom at the sawblade plate outer edge, a tooth face extending at least partially from the tooth back to the tooth gullet and a tooth edge on the tooth face, the tooth edge having a pair of tooth edge sides;
   forming at least one blade relief in at least one of the opposite tooth surfaces of each of the plurality of sawblade teeth at the tooth face at least partially between the tooth edge and the tooth gullet, the at least one blade relief disposed entirely radially outside the sawblade plate outer edge of the sawblade plate and having an inner radial relief edge at the gullet top, an outer radial relief edge at the tooth face and a curved relief boundary extending from the inner radial relief edge to the outer radial relief edge;
   grinding a corresponding one of the pair of tooth edge sides of the tooth edge of each of the plurality of sawblade teeth by movement of a grinding wheel along and against the corresponding one of the pair of tooth edge sides generally from the tooth back to the blade relief; and
   terminating the movement of the grinding wheel at the blade relief, whereby contact of the sawblade plate with the grinding wheel is prevented.

2. The method of claim 1 further comprising successively repositioning the grinding wheel for grinding the tooth edge on a next one of the plurality of sawblade teeth.

3. The method of claim 1 wherein forming the at least one blade relief comprises forming the at least one blade relief leaving a blade relief thickness of at least 0.080 inches.

4. The method of claim 1 wherein forming the at least one blade relief comprises forming the at least one blade relief having a blade relief depth of at least 0.005 inches.

5. The method of claim 1 wherein fabricating the plurality of sawblade teeth on the sawblade plate comprises fabricating the plurality of sawblade teeth each having a tooth thickness of 0.090 inches, forming the at least one blade relief in at least one of the opposite tooth surfaces of each of the plurality of sawblade teeth comprises forming the at least one blade relief leaving a blade relief thickness of at least 0.080 inches and forming the at least one blade relief in at least one of the opposite tooth surfaces of each of the plurality of sawblade teeth comprises forming the at least one blade relief having a blade relief depth of at least 0.005 inches.

6. The method of claim 1 wherein forming the at least one blade relief in at least one of the opposite tooth surfaces comprises forming a pair of blade reliefs in the opposite tooth surfaces, respectively, of each of the plurality of sawblade teeth at the tooth face at least partially between the tooth edge and the tooth gullet.

7. The method of claim 6 wherein forming the pair of blade reliefs in the opposite tooth surfaces, respectively, of each of the plurality of sawblade teeth comprises forming the pair of blade reliefs leaving a blade relief thickness of at least 0.080 inches.

8. The method of claim 6 wherein forming the pair of blade reliefs in the opposite tooth surfaces, respectively, of each of the plurality of sawblade teeth comprises forming the pair of blade reliefs each having a blade relief depth of at least 0.005 inches.

9. A saw blade preparation method, comprising:
   providing a sawblade plate having a central shaft opening;
   fabricating a plurality of sawblade teeth on the sawblade plate and leaving a sawblade plate outer edge radially outside the central shaft opening and inside the plurality of sawblade teeth, each of the plurality of sawblade teeth extending from the sawblade plate outer edge and having a pair of opposite tooth surfaces, a tooth back, a tooth gullet with a gullet top and a gullet bottom, the gullet bottom at the sawblade plate outer edge, a tooth face extending at least partially from the tooth back to the tooth gullet and a tooth edge on the tooth face; and
   forming at least one blade relief in each of the opposite tooth surfaces of each of the plurality of sawblade teeth at the tooth face at least partially between the tooth edge and the tooth gullet, the at least one blade relief in each of the opposite tooth surfaces of each of the plurality of sawblade teeth disposed entirely radially outside the sawblade plate outer edge of the sawblade plate and having an inner radial relief edge at the gullet top, an outer radial relief edge at the tooth face and a curved relief boundary extending from the inner radial relief edge to the outer radial relief edge.

10. The method of claim 9 wherein forming the at least one blade relief in each of the opposite tooth surfaces of each of the plurality of sawblade teeth comprises forming the at least one blade relief leaving a blade relief thickness of at least 0.080 inches.

11. The method of claim 9 wherein forming the at least one blade relief in each of the opposite tooth surfaces of each of the plurality of sawblade teeth comprises forming the at least one blade relief having a blade relief depth of at least 0.005 inches.

12. The method of claim 9 wherein fabricating the plurality of sawblade teeth on the sawblade plate comprises fabricating the plurality of sawblade teeth each having a tooth thickness of at least 0.090 inches and forming the at least one blade relief in each of the opposite tooth surfaces of each of the plurality of sawblade teeth comprises forming the at least one blade relief leaving a blade relief thickness of at least 0.080 inches and a blade relief depth of at least 0.005 inches.

13. A sawblade comprising:
   a sawblade plate having a central shaft opening;
   a plurality of sawblade teeth on the sawblade plate and a sawblade plate outer edge radially outside the central shaft opening and inside the plurality of sawblade teeth, each of the plurality of sawblade teeth extending from the sawblade plate outer edge and having a pair of opposite tooth surfaces, a tooth back, a tooth gullet with a gullet top and a gullet bottom, the gullet bottom at the sawblade plate outer edge, a tooth face extending at least partially from the tooth back to the tooth gullet and a tooth edge on the tooth face; and at least one blade relief in each of the opposite tooth surfaces of each of the plurality of sawblade teeth at the tooth face at least partially between the tooth edge and the tooth gullet, the at least one blade relief in each of the opposite tooth surfaces of each of the plurality of sawblade teeth disposed entirely radially outside the sawblade plate outer edge of the sawblade plate and having an inner radial relief edge at the gullet top, an outer radial relief edge at the tooth face and a curved relief boundary extending from the inner radial relief edge to the outer radial relief edge.

14. The sawblade of claim 13 wherein the at least one blade relief has a blade relief thickness of at least 0.080 inches.

15. The method of claim 13 wherein the at least one blade relief has a blade relief depth of at least 0.005 inches.

\* \* \* \* \*